US010448557B2

(12) United States Patent
Martin (10) Patent No.: US 10,448,557 B2
(45) Date of Patent: Oct. 22, 2019

(54) SEED TAB AND SEED BOOT ASSEMBLY WITH SEED TAB (71) Applicant: Deere & Company, Moline, IL (US)

(72) Inventor: Robert W. Martin, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 18 days.

(21) Appl. No.: 15/667,174

(22) Filed: Aug. 2, 2017

(65) Prior Publication Data
US 2019/0037763 A1 Feb. 7, 2019

(51) Int. Cl.
A01B 71/02 (2006.01)
A01C 7/10 (2006.01)
A01C 5/06 (2006.01)
A01C 7/20 (2006.01)

(52) U.S. Cl.
CPC .............. *A01B 71/02* (2013.01); *A01C 5/064* (2013.01); *A01C 5/068* (2013.01); *A01C 7/20* (2013.01); *A01C 7/105* (2013.01)

(58) Field of Classification Search
CPC ......... A01B 71/02; A01B 71/00; A01C 7/105; A01C 7/102; A01C 7/10; A01C 7/08; A01C 7/00; A01C 5/064; A01C 5/062; A01C 5/06; A01C 5/00; A01C 5/068; A01C 5/066; A01C 7/20
See application file for complete search history.

(56) References Cited

U.S. PATENT DOCUMENTS

| 5,673,638 | A | 10/1997 | Keeton |
| 6,082,275 | A | 7/2000 | Schaffert |
| 6,209,466 | B1 | 4/2001 | Wodrich |
| 6,666,156 | B1 | 12/2003 | Mayerle et al. |
| 7,168,376 | B2 | 1/2007 | Johnston |
| 9,402,341 | B1 | 8/2016 | Wipf |
| 2016/0192582 | A1 | 7/2016 | Hagny |
| 2017/0094895 | A1 | 4/2017 | Garner et al. |

FOREIGN PATENT DOCUMENTS

EP 3150038 A1 4/2017

OTHER PUBLICATIONS

Needham AG Technologies, LLC, 2017 Product Guide, Nov. 15, 2016.
European Search Report for application No. 18185055.3 dated Dec. 4, 2018.

Primary Examiner — Christopher J. Novosad
(74) Attorney, Agent, or Firm — Klintworth & Rozenblat IP LLP (57) ABSTRACT A seed tab for a seed boot having a seed passage extending from an inlet to an outlet includes a tab body and a tab tail. The tab body has a mounting arrangement at a first end and a laterally outer edge. The tab tail extends from the tab body to a second end and has a laterally outer edge that extends laterally outward of the laterally outer edge of the tab body. A laterally extending edge extends between the laterally outer edge of the tab body and the laterally outer edge of the tab tail. The seed tab is configured so that, when the tab body is connected to the seed boot at the mounting arrangement, the tab tail extends downwardly behind the outlet of the seed boot.

18 Claims, 7 Drawing Sheets

SEED TAB AND SEED BOOT ASSEMBLY WITH SEED TAB

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The present invention pertains to seeding machines, and in particular to a seed boot assembly having a seed tab.

BACKGROUND OF THE DISCLOSURE

Seeding machines, such as various singulating and volumetric, air and gravity-fed, seeders may be used for planting seeds. For example, seeds from a supply hopper may be delivered to seed meters associated with individual planting units. Each seed meter may meter seed through a seed tube. A furrow opener of the planting unit may create a seed furrow immediately in front of the end of the seed tube. A seed boot may be attached to the seed tube to direct the seed into the seed furrow, which may be closed by a furrow closing wheel of the planting unit.

Proper placement of the seeds within the furrow is important to better ensure high crop yield, this includes proper spacing of the seeds within the furrow as well as retention of the seeds within the furrow and proper coverage of the seeds by the ground after the furrow is closed. The process of dispensing the seeds may cause the seeds to be displaced from the bottom of the furrow for various reasons, including due to seed bounce in which seeds that have been deposited within the furrow bound out of the furrow after contacting the ground and before the furrow is closed by the trailing closing wheel. Flexible seed tabs (or flaps) have been attached at the outlet ends of the seed boots to act as a deflector to redirect seeds downward and reduce seed loss from seed bounce and the like. Generally, seed tabs are prone to wear and breakage from contact with the ground as well as deterioration from UV light.

SUMMARY OF THE DISCLOSURE

The disclosure provides a seed boot assembly for a seeding machine in which an improved seed tab configuration improves seed retention within the furrow formed in the ground.

In one aspect the disclosure provides a seed tab for a seed boot having a seed passage extending from an inlet to an outlet. The seed tab includes a tab body and a tab tail. The tab body has a mounting arrangement at a first end and a laterally outer edge. The tab tail extends from the tab body to a second end and has a laterally outer edge that extends laterally outward of the laterally outer edge of the tab body. A laterally extending edge extends between the laterally outer edge of the tab body and the laterally outer edge of the tab tail. The seed tab is configured so that, when the tab body is connected to the seed boot at the mounting arrangement, the tab tail extends downwardly behind the outlet of the seed boot.

In another aspect the disclosure provides a seed boot assembly for a seeding machine. The seed boot assembly includes a seed boot and a seed tab. The seed boot defines a seed passage extending from an inlet to an outlet at a back end. The seed tab has a mounting arrangement at a first end configured to couple the seed tab to the back end of the seed boot so that a second end of the seed tab extends downwardly behind the outlet of the seed boot. The seed tab has a first laterally outer edge extending proximate an inner surface of the seed passage of the seed boot and a second laterally outer edge that extends laterally outward of the first laterally outer edge and the seed passage of the seed boot.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed seed boot and seed tab arrangement, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Reference is made herein to a "lateral" orientation, direction or location. As used herein, lateral refers to a horizontal dimension generally perpendicular to the fore-aft centerline or center plane of the seeding machine (e.g., towing vehicle and/or planting implement) that generally extends in the travel direction thereof. Further reference is made to an "inner" (or "inward") or an "outer" (or "outward") lateral orientation, direction or location. As used herein, such terms of spatial relationship may be considered with respect to the centerline of the seeding machine or other reference plane of one or more components thereof (e.g., a given planting unit or component of a planting unit). Thus, for example, reference to an "inner lateral" orientation, direction or location may be understood to correspond to a lateral side near or adjacent a furrow opening disk of a planting unit. Reference to an "outer lateral" orientation, direction or location then will be understood to be the orientation, direction or location that is laterally farther away from the opener disk (i.e., the opposite of the inner or inward orientation, direction or location).

In certain seeding applications, it may be useful to provide a seed boot at the end of the seed tube through which seed is metered or otherwise delivered (e.g., singulated or volumetrically) from the planting unit, which may be part of a seeding machine implement towed by an agricultural tractor. The seed boot may be located in close proximity to an opener disk or other seed furrow forming assembly so that the seed may be delivered in close proximity to the seed furrow. The seed boot may have a seed passage following a rearward and downward path that imparts a rearward and downward trajectory to the seeds with respect to a travel direction of the planting unit. The location and configuration of the seed boot may also allow it to aid in maintaining a suitable furrow opening through which the seed may be deposited into the seed furrow. The seed passage may contain or be defined by a boot liner, which may a separate component of various configurations (e.g., a flexible tube construction) that aids in unfettered passage of the seeds through the seed boot from the seed tube to the seed furrow.

It may also be useful to attach an extension member to the seed boot or other part of the planting unit at or near the outlet of the seed passage defined by the seed boot. The extension member, sometimes referred to as a flap (e.g., a "seed tab" or "seed bounce flap"), may be attached and configured to extend behind the seed passage outlet in a downwardly directed cantilever manner so that its free end will come in contact with the ground when the seed boot is lowered near or into the furrow. The seed tab may thus block or deflect back into the furrow seeds that may bounce or otherwise be thrown out of the furrow. The seed tab may be rigid, but often the seed tab is flexible to allow it bend or flex upward when contacting the ground to prevent or reduce damage or breakage to the seed tab, the seed boot or other parts of the planting unit. In some cases, the seed tab is formed of a material selected such that the seed tab extends straight when unloaded, but when contacting the ground not only flexes, but also applies a reactive force tending to keep the seed tab in contact with the ground, flexibly yet firmly.

In some cases, the seed tabs have a simple linear configuration, such as a straight, square-cornered rectilinear bar stock (i.e., straight, rectangular cross-section). During use, seed tabs may undergo significant wear from abrasion due to contact with the ground (and rocks, plants and other materials), particularly at edges (the lateral outer edges) that contacts the walls of the furrows. The square corners of such seed tabs may wear down over time to angled surfaces generally corresponding to the tapered furrow walls against which they ride during seeding. Other seed tabs have pre-tapered free ends to avoid much of this wear cycle and associated material loss. In both cases, however, the seed tabs, later or initially, generally take the shape of straight bars or tabs with tapered free ends that fit down into, and ride against, the tapered walls of the furrows. Generally, this works to enclose the outer edges of the furrows and tends to block seeds from bouncing out of the furrows.

Still it has come to the attention of the inventors of this disclosure that the conventional seed boot assemblies, and the seed tabs themselves, have shortcomings that permit unwanted seed loss by seeds passing up into the side walls of the furrow or out of the furrow through a gap between the seed boot and the outer edge of the seed tab near the outer wall of the furrow. This disclosure provides a seed boot assembly and seed tab that address this problem, and thereby improves seed placement at the bottom of the furrow and seed retention within the seed furrow.

The seed boot and seed tab of this disclosure differ from the straight tab or tapered tab configurations of conventional seed tabs. In certain embodiments, the seed tab of this disclosure has a winged tail, or put another way stepped or notched edge configuration, that provides for a laterally widened tail compared to its upper body or the seed boot (especially the internal seed passage thereof) to which the seed tab is mounted typically. In other words, the seed tab has a free end or tail with a laterally outer edge that extends laterally outward of the laterally outer edge of the tab body. That is, the seed tab has a first laterally outer edge extending proximate an inner surface of the seed passage of the seed boot and a second laterally outer edge that extends laterally outward of the first laterally outer edge.

In some cases, the second laterally outer edge also extends laterally outward of the seed passage of the seed boot. The stepped, notched or widened area of the seed tab is located to accommodate a laterally outer wall of the seed boot, and in particular, to fill in or enclose an otherwise open area or gap that is near or immediately downstream (in the travel direction) from the seed boot. The seed tab extending in this downstream area closes, or effectively closes, such openings or gaps left open by conventional seed tabs and seed boot assemblies, thus improving seed placement and retention within the seed furrow. In various embodiments, the seed tab defines a laterally extending edge between the laterally outer edge of the tab body and the laterally outer edge of the tab tail. The laterally extending edge is disposed proximate an edge surface at the back end of the seed boot. This close positioning of the seed boot and seed tab, and the close position or contact of these components to the adjacent wall of the furrow and to the furrow opener, encloses the furrow volume in which seeds are intended to be deposited, with such enclosure redirecting and retaining seeds that may otherwise be lost using conventional seed tabs.

In various other configurations, some or all of the laterally outer edge of the tab body may be substantially parallel with some or all of the laterally outer edge of the tab tail. Some or all of the laterally inner and outer edges of the tab body may also be substantially parallel. The laterally inner edge of the tab tail may extend laterally outwardly (or narrow) from the laterally inner edge of the tab body. The laterally inner edge of the tab tail may taper laterally inward in a straight line from the laterally inner edge of the tab body to its free (or second) end. A laterally extending, and generally downwardly facing, edge may extend along the free end between the laterally inner and outer edges of the tab tail. A mounting arrangement, such as an opening for a threaded fastener, may extend through the tab body for mounting the seed tab to the seed boot or other component of the planting unit.

Referring now to the figures of the drawings, one or more example seed boots and seed tabs will be described in detail. It should be understood that other seed boot and/or seed tab configurations may be within the scope of this disclosure, which is thus not to be limited by the illustrated examples described below. Moreover, the example seed boot and seed tab are described with respect to an example planting unit having a volumetric seed meter dispensing seeds under gravity or by forced air, such as is often used to meter small grains, such as wheat, soybeans or the like. However, the seed boot and seed tab of this disclosure may be used with other planting unit assemblies utilizing other seed meters or other seed dispensing mechanisms.

Figure 1:
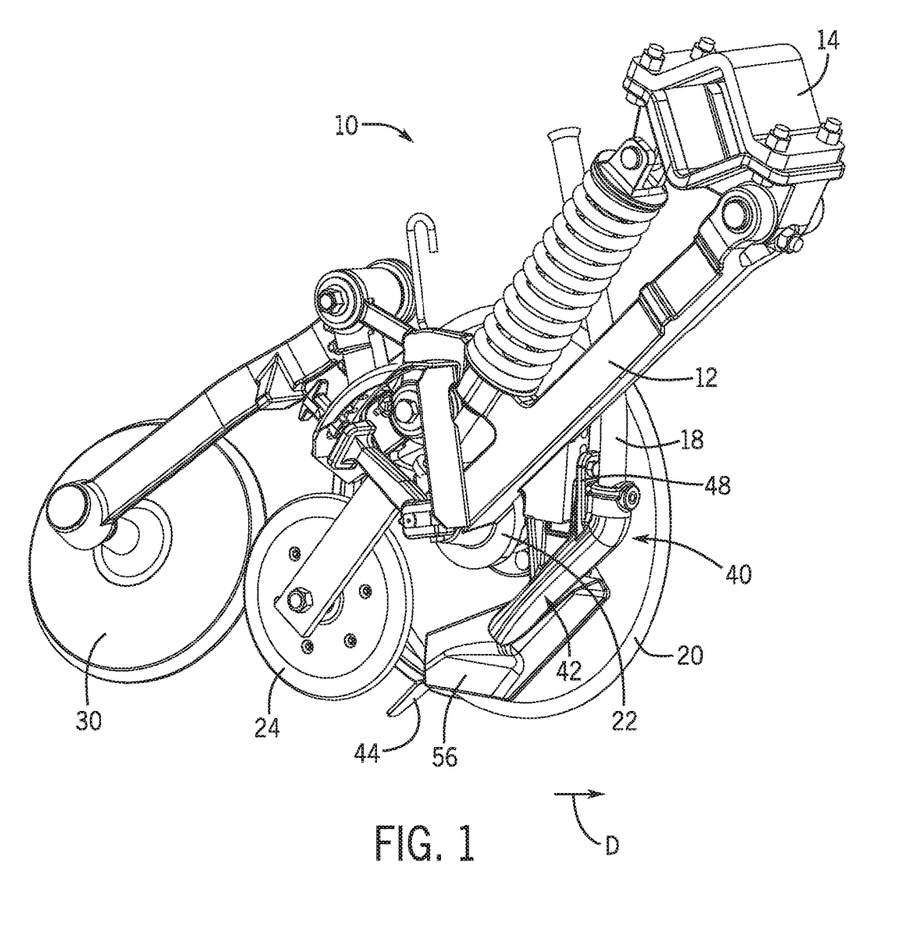
FIG. 1 is a perspective view of a planting unit for a seeding machine in which a seed boot assembly with an improved seed tab of this disclosure may be incorporated.

FIG. 1 depicts an individual planting unit 10 for a seeding machine (not shown). The planting unit 10 has a planting unit frame 12 that is coupled to the seeding machine frame (e.g., a rockshaft thereof) by a bar clamp 14. The seed is delivered to the planting unit 10 by gravity or pneumatically by a seed tube 18 that extends down from a lower part of the planting unit 10. The seed tube 18 in the illustrated example is a plastic or metal tube. Note that in alternate embodiments, the planting unit frame 12 may mount a seed meter assembly that may include a mini-hopper holding an accumulated collection of seed from a main seed hopper on the seeding machine or a commodity cart associated with the seeding machine.

The planting unit frame 12 mounts a single disk furrow opener 20 that may rotate relative to the planting unit frame on a bearing assembly 22, which may be aligned with or angled with respect to the travel direction of the seeding machine. In the illustrated example, the furrow opener 20 is angled with respect to a travel direction D to form a generally V-shaped furrow when the furrow opener 20 cuts into the ground into which the seed is deposited. A rotating seed press wheel 24 is mounted to the planting unit frame 12 behind the furrow opener 20 for pressing deposited seeds into the seed furrow. Mounted to the planting unit frame 12 immediately behind the seed press wheel 24 is a rotating closing wheel 30 for collapsing the seed furrow and covering the deposited seeds with a loose layer of soil.

Figure 2:
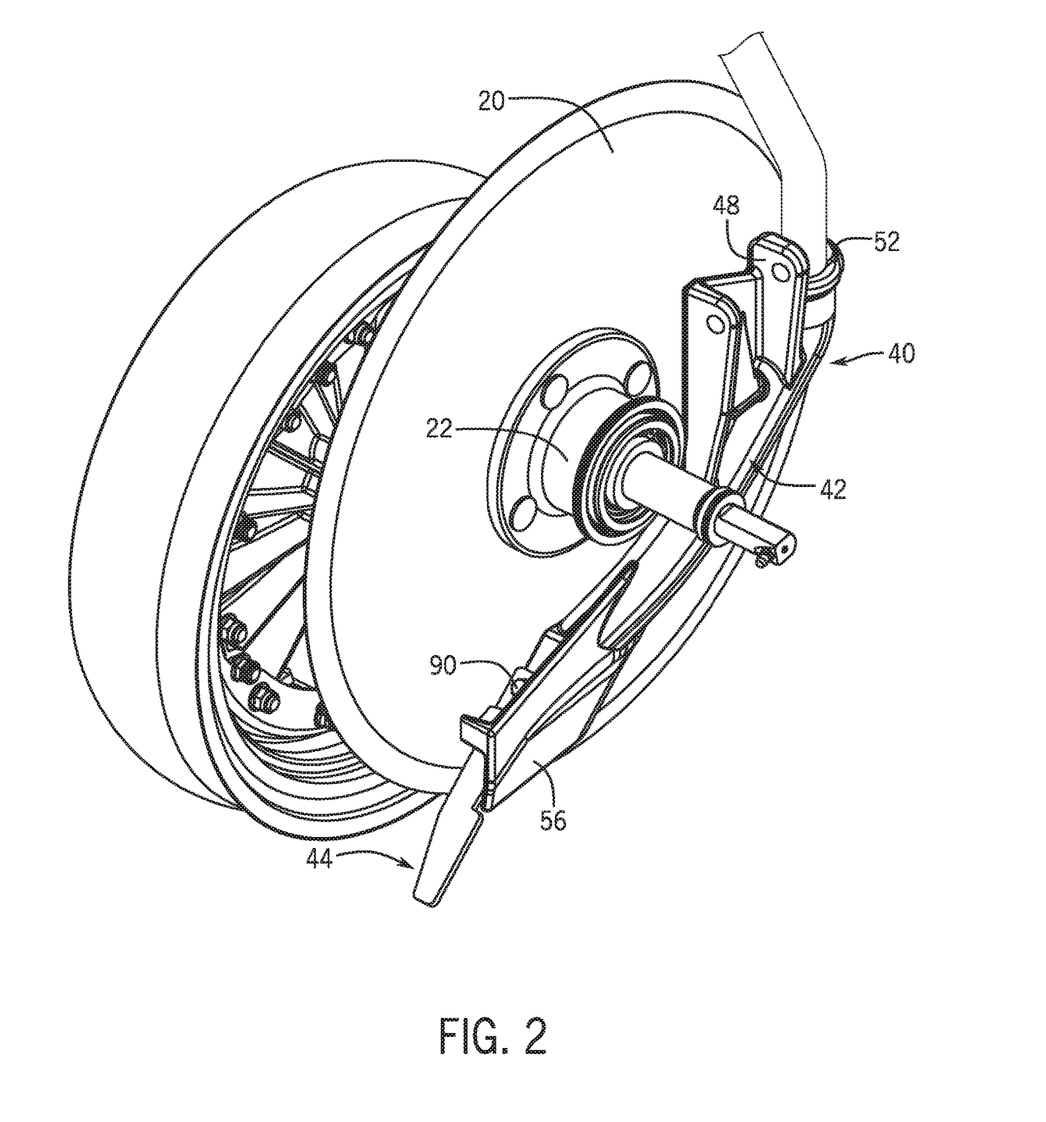
FIG. 2 is a perspective view showing the seed boot assembly and a furrow opener thereof.
Figure 3:
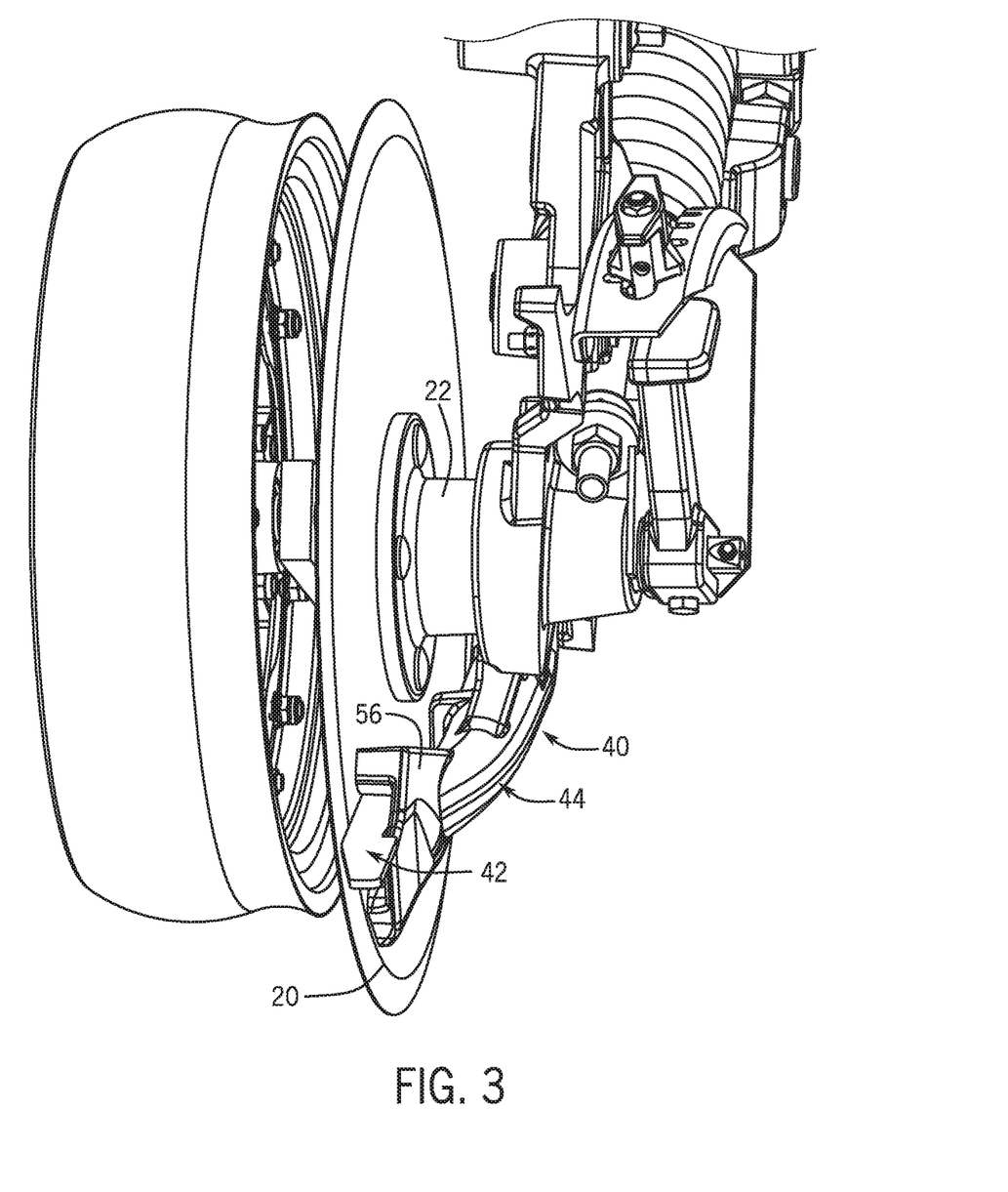
FIG. 3 is a perspective view from the rear looking forward thereof.
Figure 4:
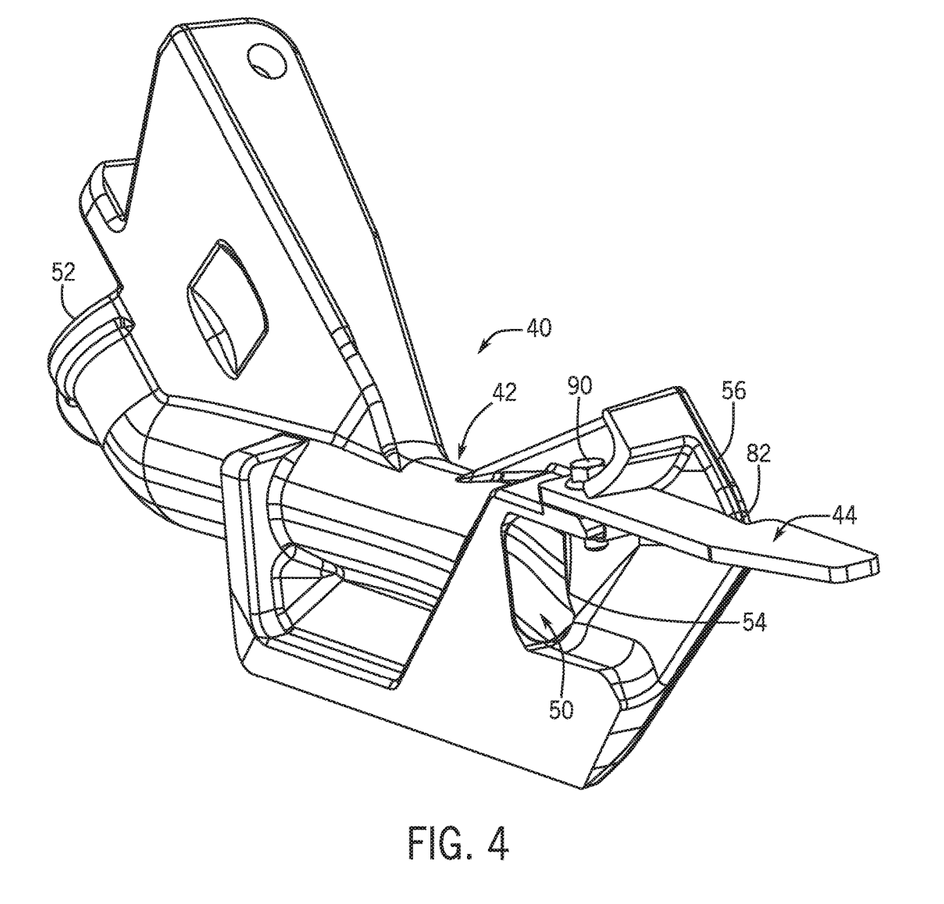
FIG. 4 is an inside perspective view of the seed boot assembly.

Referring also to FIGS. 2-4, seed is directed from the seed tube 18 downwardly into a seed boot assembly 40 that is disposed along and to a rear side of the furrow opener 20. The seed boot assembly 40 includes a seed boot 42 and a seed tab 44. In some embodiments, the seed boot 42 may also include a boot liner (not shown), such as flexible tube or other liner material, that may couple directly to the seed tube 18, or indirectly via an adapter piece. In certain embodiments, the seed boot 42 may be a rigid assembled or monolithic component. The seed boot 42 may mount to the planting unit frame 12 in any suitable manner, for example, by an integrally formed mounting tab 48, a pivot bolt or pin and a spring to bias the seed boot 42 into the furrow opener 20. The seed boot 42 defines a seed passage 50 that has an inlet end 52 and an outlet end 54. The inlet end 52 is located in front of the mounting tab 48 and the bearing assembly 22, with respect to the travel direction D of the planting unit 10. The outlet end 54 is located below and behind the mounting tab 48 and the bearing assembly 22. An integrally formed vane 56 projects downward and rearward from the outlet end 54. The vane 56 forms a laterally outer side wall for the outlet end 54 of the seed boot 42. The furrow opener 20 is positioned closely to the seed boot 42 and effectively forms a laterally inner side wall for the outlet end 54 of the seed boot 42.

In the illustrated example, the seed boot 42 follows a generally straight trajectory from a side perspective, extending downward and rearward at approximately 35-50 degrees, and in some cases about 45 degrees, from horizontal when mounted to the planting unit frame 12, as mentioned, depending on the depth and height setting of the planting unit frame 12 (e.g., the rockshaft) from the ground. The seed passage 50 may also have a generally straight, and uniform, cross-section between the inlet end 52 and the outlet end 54. Generally, however, the seed passage 50 is curved to provide adequate clearance between the seed boot 42 and the hub of the furrow opener 20. In the illustrated example, the seed passage 50 has a contoured inner dimension that follows a slightly curved trajectory (e.g., in the laterally outward to inward direction) that is configured to help reduce side to side (i.e., lateral) seed bounce within the seed boot 42, or to otherwise effect seed bounce that causes the seeds to follow a trajectory that expels the seeds in straight lines directly behind the seed boot 42. This helps to reduce the number of seeds being deposited other than at the bottom of the furrow (e.g., outside the furrow when the seed boot is running above the ground plane.) The seed passage 50 may have a generally circular cross-section at the inlet end 52 and a portion of its length, and have a non-circular cross-sectional through the remainder of its length and at the outlet end 54, transitioning smoothly from the generally circular cross-section to an oblong cross-section which generally has a smaller lateral (sideways) dimension than its height dimension at the outlet end 54. The outer surface dimensions and configuration of the seed boot 42 may also vary. However, in the illustrated example, the seed boot 42 has a compact profile in the lateral dimension compared to certain conventional seed boots, with little to no part of the seed boot 42 extending beyond the laterally inner side of the furrow opener, and may be positioned and configured to skim across the surface of the furrow wall opposite the furrow opener 20. This may reduce wearing of the seed boot 42 and aid in enclosing the seeds deposited from the seed boot 42, in part by reducing boot to soil contact that may tend to widen the top of the furrow inadvertently.

As described, the seed boot 42, including the vane 56, in combination with the furrow opener 20 and the furrow walls, operates to enclose or confine, or otherwise define, the volume in which seeds may be deposited from the seed boot 42. The primary exception to this is the space to the rear (opposite the travel direction D) of the outlet end 54. The seed tab 44 serves this function.

Figure 7:
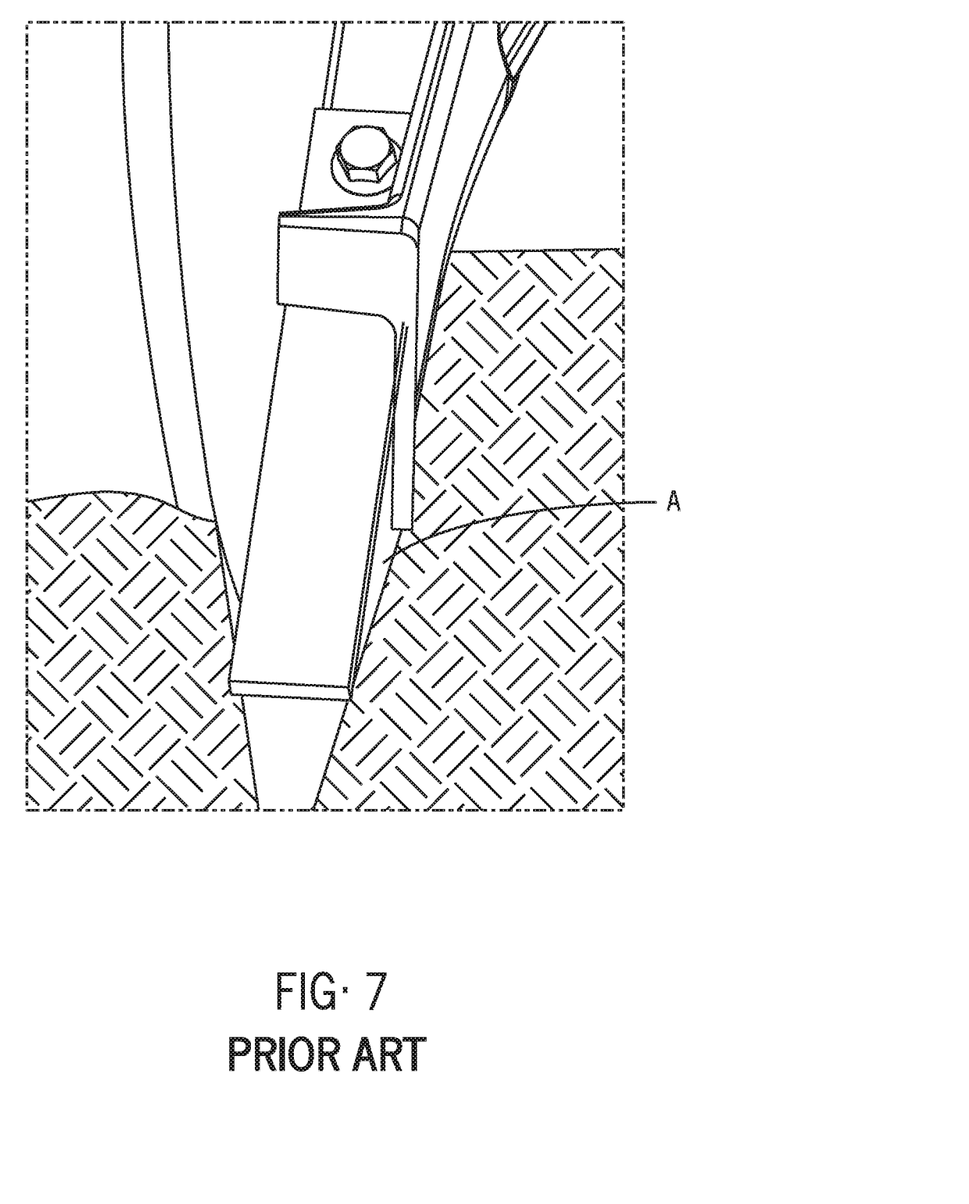
FIG. 7 is a view similar to FIG. 6 showing a prior art seed tab and seed boot.

As shown in FIG. 7, certain prior art seed tabs have a rectangular shape such that the lower square corners contact the low, narrow portion of the V-shaped furrow. This corner contact causes such seed tabs to lift up and away from contact with the furrow, at least until the material of the seed tabs is worn away enough for the seed tab to generally match the furrow shape. Such seed tabs may leave open a window between the furrow wall and the seed tab (especially an area "A" under a rear outer corner of the seed boot) on the boot side of the furrow that can allow seeds with a side-to-side trajectory to pass the seed tab high above the furrow bottom in front of the pressing wheel. These aspects of prior art seed tabs leave them prone to allowing seeds to bounce up and bypass the seed tab and either escape the furrow or be pressed into the furrow walls above the bottom of the furrow.

An example improved seed tab configuration is illustrated in FIGS. 5A-5E. The seed tab 44 has a tab body 58 with a mounting arrangement 60 at a first end 62, and has a tab tail 64 extending from the tab body 58 to a second end 66. As shown, in the illustrated example, the mounting arrangement 60 is an opening extending through the tab body 58 that is sized and configured to receive a mechanical fastener (e.g., a threaded fastener (bolt or screw) 90). The tab tail 64 has a laterally outer edge 70 that extends laterally outward of a laterally outer edge 68 of the tab body 58. The seed tab 44 may be rigid. However, in the illustrated example, the seed tab is of flexible construction to bend or flex upwardly when the tab tail 64 contacts the ground with sufficient downward force during operation of the planting unit 10. As examples, the seed tab 44 may be a thermoplastic polyurethane, a polyethylene or like material, and formed using a suitable injection molding, milling or other operation. The seed tab 44 may have material properties or other characteristics that provide desirable flex and downforce values tending to maintain the seed tab 44 in contact with the ground during seeding. In any case, the seed tab 44 is configured so that, when the tab body 58 is connected to the seed boot 42 at the mounting arrangement 60, the tab tail 64 extends downwardly behind the outlet end 54 of the seed boot 42. As shown, the seed tab 44 may be mounted to the back of the seed boot 42 directly above the exit opening at the outlet end 54 of the seed boot 42.

Figure 6:
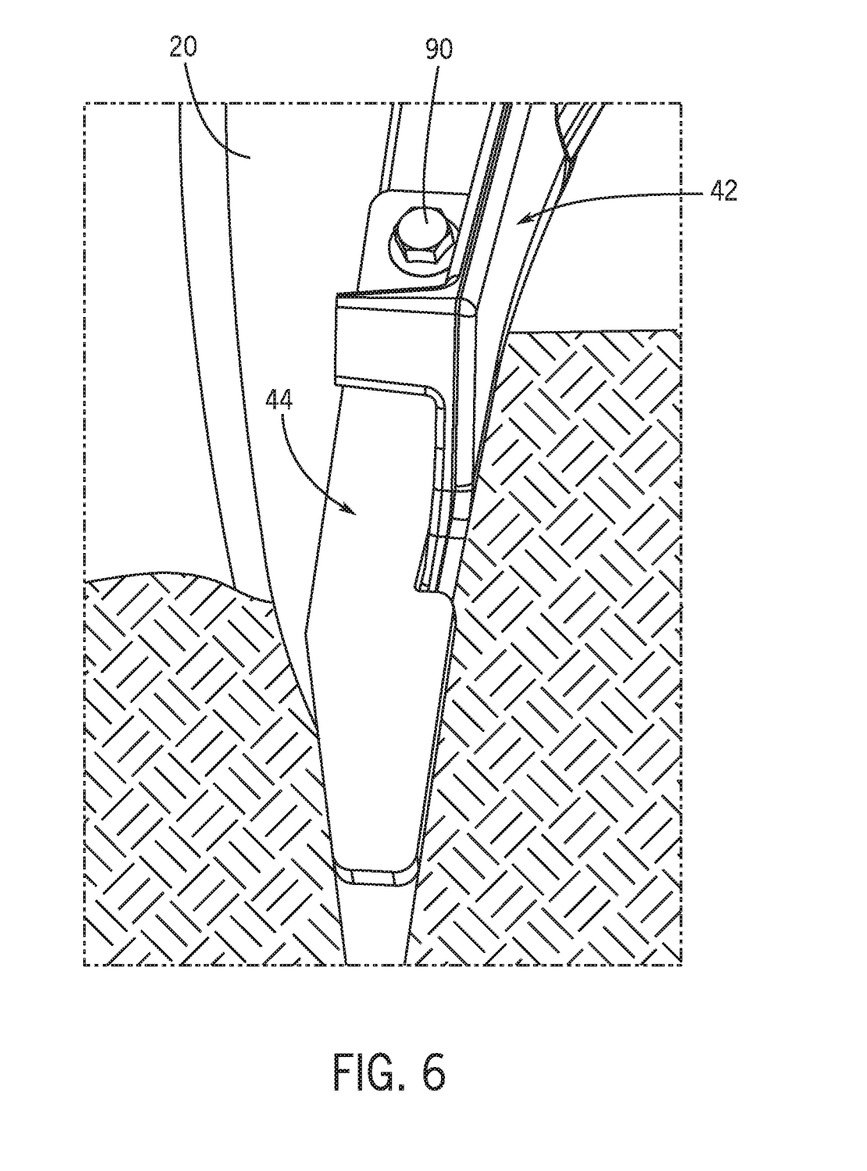
FIG. 6 is a partial front sectional showing the seed boot assembly extending into a furrow opened by the furrow opener of the planting unit.

Referring also to FIG. 6, the profile of the seed tab 44 is configured to better fit within the V-shaped furrow formed by the furrow opener 20. Generally, an inner edge 74 of the tab tail 64 may contact the furrow wall on the opener (laterally inner) side of the furrow from at or near the bottom of the furrow to where the seed tab 44 contacts the furrow opener 20. An inner edge 76 of the tab body 58 may remain in contact with the furrow opener 20 to the mounting arrangement 60 where the seed tab 44 is attached to the seed boot 42. On the opposite, laterally outer side of the furrow, the edge 70 of the tab tail 64 may contact the furrow wall from at or near the bottom of the furrow to the underside of the seed boot 42 at a back corner where the outer edge then jogs laterally inward. The edge 68 of the tab body 58 may contact a laterally inside wall of the seed boot 42 (e.g., the inside of the vane 56) to the mounting arrangement 60 where the seed tab 44 is attached to the seed boot 42.

Figure 5A:
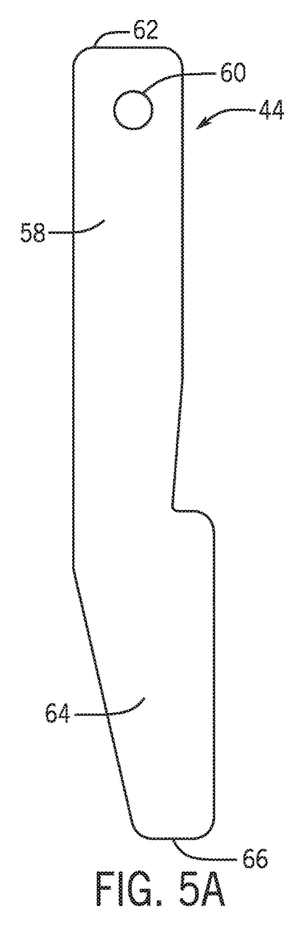
FIGS. 5A-5E are orthographic views of an example seed tab in isolation.
Figure 5B:
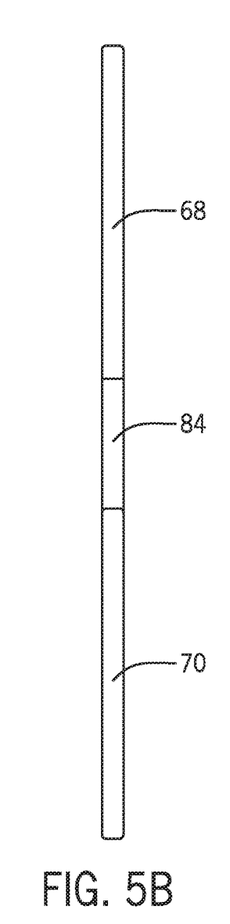
Figure 5C:
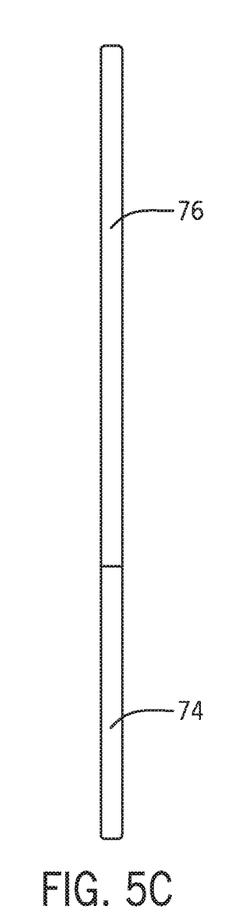
Figure 5D:
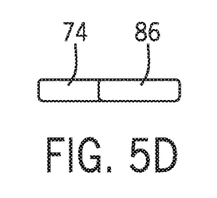
Figure 5E:
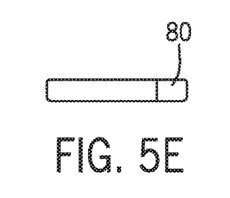

More specifically, the seed tab 44 has a laterally extending (and slightly upwardly facing) edge 80 that extends between the edge 68 of the tab body 58 and the edge 70 of the tab tail 64. The edge 80 extends at an angle (about 90 degrees) with respect to the edge 68 of the tab body 58, thus forming a generally right angle "notch". The notch, specifically, the lateral edge 80, is disposed proximate an edge surface 82 at the back end of the seed boot 42 (e.g., a rear edge surface of the vane 56) when the seed tab 44 is connected to the seed boot 42. The edge 76 of the tab body 58 and the edge 70 of the tab tail 64 may be substantially parallel to the edge 68 of the tab body 58, or at least with a portion of the edge 68. As shown, a portion 84 of the edge 68 of the tab body 58 may be angled (e.g., laterally inward) with respect to the rest of the edge 68 of the tab body 58 and with the edge 70 of the tab tail 64 and the edge 76 of the tab body 58. Thus, the edge surfaces 80 and 84 form a slightly acute angle notch, as shown in FIG. 5A. The edge 76 of the tab body 58 and the edge 74 of the tab tail 64 may be inclined with respect to one another. In particular, the edge 74 of the tab tail 64 may extend laterally outward from the edge 76 of the tab body 58, for example, tapering laterally outward in a straight line from the edge 76 of the tab body 58 to the second end 66 of the tab tail 64. Another laterally extending (and slightly downwardly facing) edge extends along the second end 66 between the edges 70 and 74 of the tab tail 64.

In operation, as the seeding machine, with the planting unit 10, is pulled through a field by a tractor, the furrow opener 20 forms a seed furrow. Seeds passing through the seed tube 18 are directed downward and rearward and exit the outlet end 54 of the seed boot 42 into the seed furrow. In some cases, the furrow may have a relatively small dimension, for example, being only ½ inch wide by ½-1½% inches deep, being even more narrow at the bottom of the furrow valley. The press wheel 24 fits into the seed furrow and presses the seeds into the bottom of the seed furrow. Since the seed passage 50 is not straight (to provide clearance for furrow opener hub), the seeds must change directions several times as they travel through the seed boot 42.

Generally, the seeds exit the seed boot at a trajectory generally paralleling the center of the seed passage 50 causing them to hit the bottom of the furrow. However, some seeds develop a side-to-side bounce that may cause the seeds to hit the side walls of the furrow or in some cases to be ejected from the furrow. Even when the seeds hit the furrow bottom or walls they can bounce and tumble. Without a seed tab, many of these bouncing and tumbling seeds will get pressed into the side wall of the furrow by the trailing press wheel 24, and some will also bounce or tumble enough to completely exit the furrow. The seed tab 44 directs most of these seeds to the bottom of the furrow so that the press wheel 24 can press the seeds into the bottom of the furrow.

The seed tab 44 is generally oriented to run parallel to the seed passage 50 of the seed boot 42 and extends from the seed boot 42 to at or near the bottom of the furrow. The seed tab 44 directs seeds to the bottom of the furrow by completing the enclosure formed by the furrow, the furrow opener 20 and the seed boot 42 by closing off an open space or window immediately downstream from the outlet end 54 of the seed boot 42. The wall structure of the seed tab 44 on the side laterally opposite from the furrow opener 20 closes this window. These features of the seed boot assembly 40 reduce the incidence of seeds missing the seed furrows.

The seed boot assembly 40 thus reduces boot wear and seed depth control and placement. A higher percentage of seeds are deposited and pressed in the bottom of the furrow. Wall structure at the outside of the seed tab 44 grazes the furrow wall and better encloses the volume intended for seed deposit. This helps to keep more seeds from bouncing out of the furrow or getting pressed into the sidewall by the closing wheel.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A seed tab for a seed boot having a seed passage extending from an inlet to an outlet, the seed tab comprising:
   a tab body having a mounting arrangement at a first end and having a laterally outer edge; and
   a tab tail extending from the tab body to a second end, the tab tail having a laterally outer edge that extends laterally outward of the laterally outer edge of the tab body;

wherein a laterally extending edge extends between the laterally outer edge of the tab body and the laterally outer edge of the tab tail;

wherein the laterally outer edge of the tab tail, from proximate the laterally extending edge to proximate the second end, is substantially parallel with at least a portion of the laterally outer edge of the tab body; and wherein the seed tab is configured so that, when the tab body is connected to the seed boot at the mounting arrangement, the tab tail extends downwardly behind the outlet of the seed boot.

2. The seed tab of claim 1, wherein the laterally extending edge cooperates with the laterally outer edge of the tab body and the laterally outer edge of the tab tail to form a notch.

3. The seed tab of claim 2, wherein the laterally extending edge is disposed proximate an edge surface at a back end of the seed boot when the seed tab is connected to the seed boot.

4. The seed tab of claim 1, wherein the tab body has a laterally inner edge; and wherein the tab tail has a laterally inner edge.

5. The seed tab of claim 4, wherein at least portions of the laterally inner and outer edges of the tab body are substantially parallel.

6. The seed tab of claim 4, wherein the laterally inner edge of the tab tail extends laterally outward from the laterally inner edge of the tab body.

7. The seed tab of claim 4, wherein the laterally inner edge of the tab tail tapers laterally outward in a straight line from the laterally inner edge of the tab body to the second end.

8. The seed tab of claim 4, wherein another laterally extending edge extends along the second end between the laterally inner and outer edges of the tab tail.

9. The seed tab of claim 1, wherein the mounting arrangement is an opening extending through the tab body configured to receive a threaded fastener.

10. A seed boot assembly comprising:
a seed boot defining a seed passage extending from an inlet to an outlet at a back end; and
a seed tab having a mounting arrangement at a first end configured to couple the seed tab to the back end of the seed boot so that a second end of the seed tab extends downwardly behind the outlet of the seed boot;

wherein the seed tab has a tab body defining a first laterally outer edge extending proximate an inner surface of the seed passage of the seed boot and has a tab tail defining a second laterally outer edge that extends laterally outward of the first laterally outer edge and the seed passage of the seed boot, the second laterally outer edge being substantially parallel with at least a portion of the first laterally outer edge from proximate the seed boot to proximate the second end.

11. The seed boot assembly of claim 10,
wherein a laterally extending edge extends between the laterally outer edge of the tab body and the laterally outer edge of the tab tail.

12. The seed boot assembly of claim 11, wherein the laterally extending edge is disposed proximate an edge surface at the back end of the seed boot.

13. The seed boot assembly of claim 10, wherein the tab body has a laterally inner edge; and wherein the tab tail has a laterally inner edge.

14. The seed boot assembly of claim 13, wherein at least portions of the laterally inner and outer edges of the tab body are substantially parallel.

15. The seed boot assembly of claim 13, wherein the laterally inner edge of the tab tail extends laterally outward from the laterally inner edge of the tab body.

16. The seed boot assembly of claim 13, wherein the laterally inner edge of the tab tail tapers laterally outward in a straight line from the laterally inner edge of the tab body to the second end.

17. The seed boot assembly of claim 13, wherein another laterally extending edge extends along the second end between the laterally inner and outer edges of the tab tail.

18. The seed boot assembly of claim 10, wherein the mounting arrangement is an opening extending through the tab body configured to receive a threaded fastener.

* * * * *